July 16, 1929.  J. C. BOHMKER  1,720,994
FEEDING MECHANISM
Filed March 22, 1924
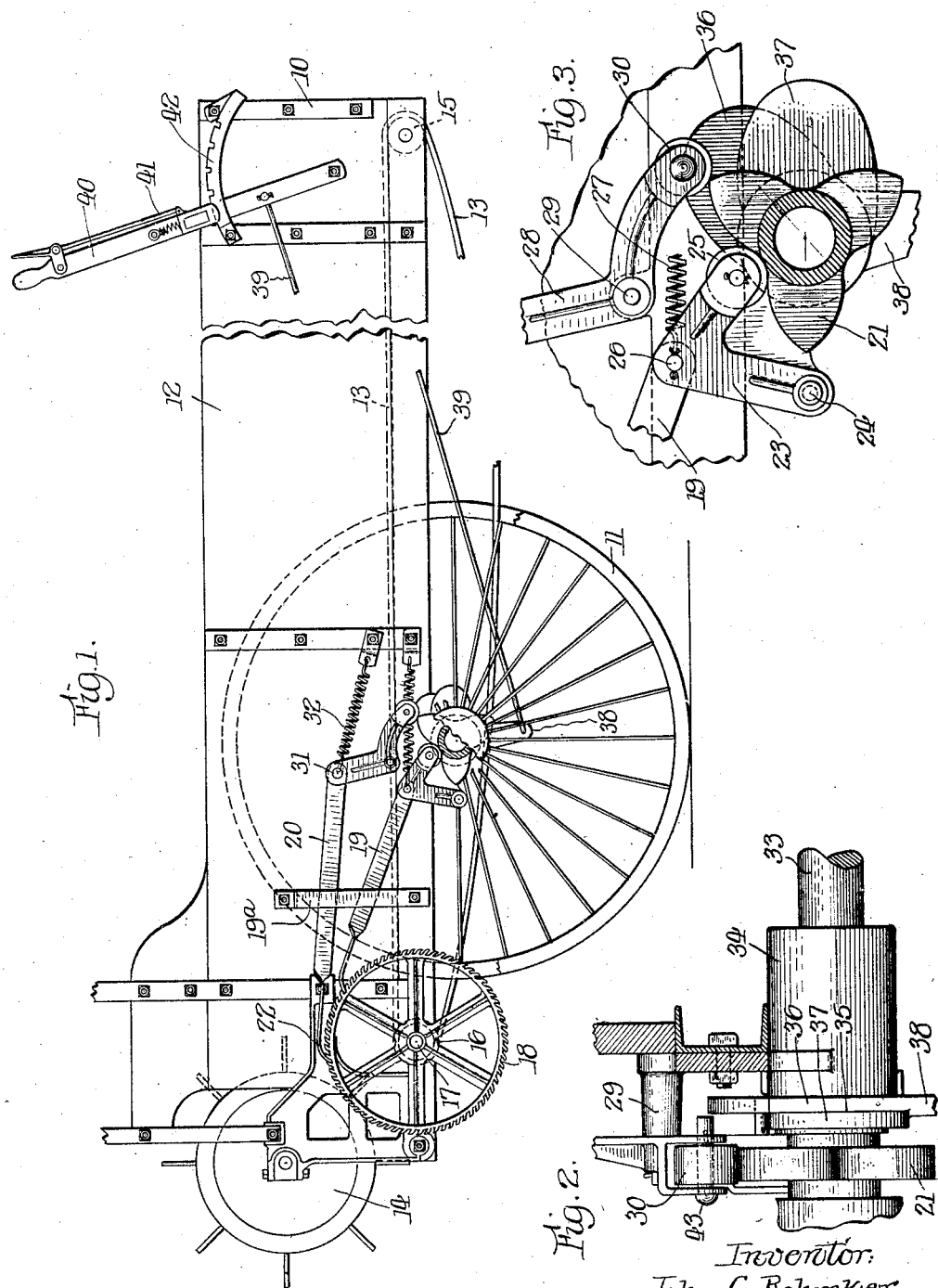

Patented July 16, 1929.

1,720,994

UNITED STATES PATENT OFFICE.

JOHN C. BOHMKER, OF BRADLEY, ILLINOIS, ASSIGNOR TO SEARS, ROEBUCK AND CO., OF CHICAGO, ILLINOIS, A CORPORATION OF NEW YORK.

FEEDING MECHANISM.

Application filed March 22, 1924. Serial No. 701,232.

This invention has reference to farming implements such as manure spreaders and particularly to a feeding mechanism therefor.

One object of the invention is to provide a simple actuating mechanism including a pawl and ratchet which will permit regulation of the stroke of the pawl while the same is in operation.

Another object is to provide a mechanism permitting a plurality of pawls to engage the ratchet wheel successively so that a more nearly uniform feed of the material is obtained.

Still another object is to include in the regulating device a means of advantageous character for totally disengaging the power from the feeding mechanism.

In the drawings I have illustrated a manure spreader equipped with a continuous feed belt which conveys the manure to a spreading cylinder according to the adjustment of the feed mechanism, hereinafter disclosed.

Figure 1 shows a wagon body equipped with one form of my invention.

Fig. 2 is a view of the cam mechanism looking from the right in Fig. 1.

Fig. 3 is a detail view of the cam mechanism of Fig. 1 and corresponds to a view from the left of Fig. 2.

The numeral 10 designates any suitable wagon provided with wheels upon one of which as, for example, 11 is mounted means for power transmission to the feeding mechanism. The wagon has a box-like portion 12 to contain the manure and is provided with a suitable continuous conveying belt 13 upon which manure rests and is fed rearwardly toward a distributing cylinder 14. The latter may be driven by any suitable means, as, for example, that shown and described in my co-pending application, Serial No. 701,233, filing date March 22, 1924.

The continuous belt 13 is arranged to pass over a roller 15 at the front end of the wagon and over a feeding roll 16 at the rear end of the wagon. The form of belt or conveyor and its engagement with the feeding roll are immaterial to this invention, any well known type being satisfactory. The feeding roll 16 is mounted on a shaft 17 which is actuated by a ratchet wheel 18.

Suitable means are arranged between the supporting wheel 11 and the ratchet wheel 18 to transmit a feeding action thereto by the travel of the wagon over the ground. I have used cam actuated pawls for this purpose and have provided interposing cams to regulate the amount of travel of the pawls in a simple and efficient manner. Two pawls 19 and 20 have been employed, and generally speaking, one is acting on the ratchet while the other is being withdrawn thereby producing a more nearly uniform feed. I have used a three pointed cam 21 rigid with the wheel 11 to actuate the pawl 19 and hence obtain three thrusts thereof in one revolution of the wheel. By properly arranging the pawl arms 19 and 20 for actuation by the cam 21, six thrusts on the ratchet are obtained per revolution.

Each pawl arm is a freely pivoted member resting on the ratchet wheel 18 and guided by the bar 19ª. The pawl ends 22 are suitably shaped to engage with and to ride over the teeth of the ratchet. A fixed V-shaped arm 23 is pivoted at 24 to the wagon body at one extremity and carries a cam roller 25 at the other extremity. The vertex 26 is the pivotal connecting point for the pawl arm 19. A spring 27 from the vertex 26 to the wagon body serves to withdraw the pawl and to hold the roller 25 in contact with the cam 21.

An equivalent structure is provided for the pawl arm 20. This includes the bell crank 28 pivoted at 29 to the wagon body and provided at the end of one arm with a cam roller 30 and at the end of the other arm with the pivot 31 for the pawl 20 and the spring 32. The disposition of the above structure is such that the came roller 25 is in a valley of the cam when the cam roller 30 is on a peak of the cam.

The cam 21 is arranged to be turned by the wagon wheels and is here shown rigid with the wheel 11 on the axle 33 (Fig. 2) passing through the wagon hub or bearing 34. Positioned between the hub and cam 21 is a double cam, designated generally by the numeral 35, which is loosely mounted for rotation about the axle 33. This cam is arranged to be placed in the path of the cam rollers to prevent their descent into the valleys of the cam by the action of the springs. Each roller has a cam arranged to permit no descent and also to permit the maximum descent of the rollers into the valleys of the cam 21, thereby regulating the amount of feed. For this purpose the double cam 35 comprises two similar oval-shaped cams 36 and 37 adjacent to each other and disposed sixty degrees apart about the axis of rotation 33. An arm 38 is rigid with said cams for connection by a link 39 to a hand operated lever 40. For the latter a detent mechanism 41 and a locking bar 42 are provided. The rollers 25 and 30 are substantially the same widths as the cam 21, so that for the purpose of obstructing each roller by the adjusting cam 35, the pivotal pins 43 of the rollers 25 and 30 are made sufficiently long to overlie the cams 37 and 36 respectively.

It is clear that the driver from his seat need only to use the hand lever 40 to throw the feeding mechanism into operation to the extent desired according to the adjustment along the bar 42.

By movement of the hand lever 40 the cams 36 and 37 are moved to positions which are in the normal path of the levers as the rollers are actuated toward and away from the axle by the cam 21. The cams are so designed that they can be moved sufficiently far into the path of the levers that the latter do not at all ride on the cam surface. The latter position effects complete disengagement of the power. By moving the hand lever along the rack 42 the stroke of the pawls may be lengthened at the will of the operator without any other adjustment.

While I have shown and described the spreader illustrated in the drawings, the particularity with which this has been done is merely for the purpose of illustrating the principles of the invention as set forth in the appended claims.

I claim as my invention:—

1. A feeding device for manure spreaders having, in combination, a shaft having a feeding roll thereon, a ratchet wheel on said shaft, an axle, a cam rigid on said axle, a pivoted lever adapted to ride the surface of said cam, a pawl arm pivoted to said lever to engage said ratchet wheel, means to withdraw said pawl arm, a second cam mounted loosely on said shaft adapted for contact with said lever, and means for moving said second cam to remove said lever from said first cam against said withdrawal means.

2. A feeding device for manure spreaders having, in combination, a shaft having a feeding roll mounted thereon, a ratchet wheel on said shaft, a cam, means operable to rotate said cam, a plurality of pivoted levers adapted to ride the surface of said cam, a plurality of pawl arms pivoted to said levers to engage said ratchet wheel, means to withdraw said pawl arms, a plurality of cams one for each lever loosely mounted adjacent said first mentioned cam and adapted for contact with each lever, and means to move said last mentioned cams to remove each lever from said first mentioned cam against said withdrawal means.

3. A feeding device for manure spreaders having, in combination, a shaft, a feeding roll mounted on said shaft, a ratchet wheel on said shaft, an axle, a cam rigid with said axle, two pawl arms for said ratchet wheel, two lever arms pivotally supporting said pawl arms, rollers on said lever arms adapted to ride the cam surface, said lever arms and rollers being spaced for motion in opposite directions simultaneously on the said cam, and manually controlled secondary cams arranged to prevent said rollers from contacting with said first cam either partially or completely, said secondary cams being angularly arranged to limit the movement of said rollers equally.

4. A feeding device for manure spreaders having, in combination, a ratchet wheel, a rotatable cam, means for rotating said cam, a pawl for said ratchet wheel, means movable by said cam to move said pawl, a second cam adjacent said first cam and independently and concentrically rotatable with respect thereto, and means to move said second cam to vary the effective surface of said first cam whereby the stroke of said pawl is predetermined.

5. A feeding device for manure spreaders having, in combination, a ratchet wheel, a rotatable cam, means to rotate said cam, a pawl for said ratchet, means operable by said cam to move said pawl, and a second cam adjacent said first cam and movable with respect thereto to vary the effective first cam surface affecting said means, whereby the stroke of said pawl is controlled.

In testimony whereof, I have hereunto affixed my signature.

JOHN C. BOHMKER.

CERTIFICATE OF CORRECTION.

Patent No. 1,720,994.  Granted July 16, 1929, to

JOHN C. BOHMKER.

It is hereby certified that error appears in the printed specification of the above numbered patent requiring correction as follows: Page 1, line 89, for the word "came" read "cam"; page 2, line 43, claim 1, for the word "shaft" read "axle"; and that the said Letters Patent should be read with these corrections therein that the same may conform to the record of the case in the Patent Office.

Signed and sealed this 10th day of September, A. D. 1929.

(Seal)

M. J. Moore,
Acting Commissioner of Patents.